United States Patent Office 3,644,377
Patented Feb. 22, 1972

---

3,644,377
PROCESS FOR THE PREPARATION OF (4-PYRIDYLTHIO)ACETIC ACID
Chester Sapino, Jr., and Paul David Sleezer, Dewitt, N.Y., assignors to Bristol-Myers Company, New York, N.Y.
No Drawing. Filed Apr. 8, 1970, Ser. No. 26,753
Int. Cl. C07d 31/50
U.S. Cl. 260—294.8 G    5 Claims

ABSTRACT OF THE DISCLOSURE

A new and more efficient process for the preparation of 4-(pyridylthio)acetic acid has been found which produces yields of approximately 70–95%. The process comprises treating a solution of 4-(1-pyridyl)pyridinium chloride with 2-mercaptoacetic acid preferably with the aid of heat. The compound, (4-pyridylthio)acetic acid is a valuable intermediate in the preparation of biologically active cephalosporins.

BACKGROUND OF THE INVENTION

Field of the invention

The 4-(pyridylthio)acetic acid of the present invention is a valuable intermediate in the preparation of biologically active cephalosporins, in particular 7-[α-(4-pyridylthio)acetamido]cephalosporanic acid. (U.S. Pat. No. 3,422,100).

Description of the prior art (4-pyridylthio)acetic acid is an old compound known in the art. The new process for its preparation as disclosed herein is novel and unobvious in view of the prior art, the most pertinent of which is:

(1) D. Jerchel, H. Fischer and K. Thomas, Chem. Berichte, 89, 2921 (1956) which article teaches the preparation of ethyl (4-pyridylthio)acetate in 26% yield by the reaction of 4-(1-pyridyl)pyridinium chloride hydrochloride with ethyl 2-chloroacetate in the presence of hydrogen sulfide. The hydrolysis of the ethyl (4-pyridylthio)acetate to (4-pyridylthio)acetic acid was accomplished in 46% yield. The two step reaction was accomplished in overall yield of about 12% as compared with the yield of about 70–95% obtained in the one step process of the present invention.

(2) H. King and L. L. Ware, J. Chem. Soc., 873 (1959) which teaches the preparation of (4-pyridylthio) acetic acid by the mixture of 4-thiopyridone with 2-chloroacetic acid. The disadvantage of the process is the necessity of using 4-thiopyridone, an expensive starting material.

SUMMARY OF THE INVENTION

The compound having the formula

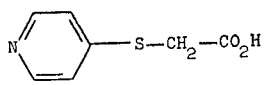

I is prepared by the process which comprises mixing together the compound

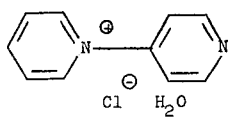

with 2-mercaptoacetic acid in about equimolar quantities in the presence of heat to produce Compound I in superior yields of about 70 to about 95%.

COMPLETE DISCLOSURE (4-pyridylthio)acetic acid is a valuable intermediate for the preparation of certain antibacterial agents, e.g., 7-[α-(4-pyridylthio)acetamido]cephalosporanic acid.

Since the compound is of commercial importance, it was highly desirable to develop a more efficient and economic method of synthesis as compared to those methods employed previously.

The object of the present invention has been achieved by the provision according to the present invention, of the process for the synthesis of the compound having the formula

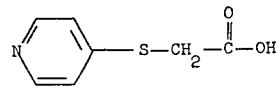

I which process comprises mixing together the compound having the formula

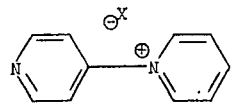

II in which X is chloro, bromo or iodo, but preferably chloro; or a hydrate or acid addition salt thereof; with at least 1 molar equivalent of 2-mercaptoacetic acid, but preferably about 1 to about 1.5 molar equivalents of mercaptoacetic acid, and most preferably in a ratio of about 1.0 molar equivalent of mercaptoacetic acid per mole of Compound II, in water with stirring with or without the aid of heat, but preferably in the range of about 50° C. to the reflux temperature of the solvent system and most preferably at about the reflux temperature, for at least 1 hour, but preferably for about 1 to 10 hours, and most preferably about 4 hours. The acid addition salts of Compound II are formed by treating the basic form of Compound II with any common acid, in particular sulfuric, hydrochloric, phosphoric, or the like, but particularly hydrochloric acid or hydrogen chloride gas.

A preferred embodiment of the present invention is the process for the preparation of the compound having the formula

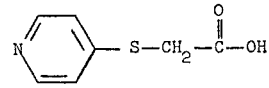

I which comprises mixing together the compound having the formula

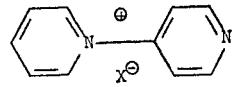

II in which X is chloro, bromo or iodo; or a hydrate or acid addition salt thereof; with at least 1 molar equivalent of 2-mercaptoacetic acid in water.

Another preferred embodiment is the process for the preparation of Compound I which process comprises mixing together a compound of Formula II with about 1 to about 1.5 molar equivalents of 2-mercaptoacetic acid in water with or without the aid of heat to produce Compound I.

Another preferred embodiment is the process for the preparation of Compound I which process comprises mixing together a compound of Formula II with about 1 to about 1.5 molar equivalents of 2-mercaptoacetic acid in water with the aid of heat to produce Compound I.

A more preferred embodiment is the process for the preparation of Compound I which process comprises mixing together a compound of Formula II with about one molar equivalent of 2-mercaptoacetic acid in water with stirring at a temperature in the range of about 50° C. to about the reflux temperature of the solvent system, for a period of time of about 1 to about 10 hours to produce Compound I.

A still more preferred embodiment is the process for the preparation of Compound I which process comprises mixing together a compound of Formula II in which X is chloro with about a one molar equivalent of 2-mercaptoacetic acid, in water with stirring at about the reflux temperature of the solvent system for a period of time of about 4 hours.

EXPERIMENTAL

EXAMPLE 1

Preparation of (4-pyridylthio)acetic acid: A solution of 4-(1-pyridyl)pyridinium chloride (2.0 g., 10.4 mmoles)[1] in water (50 ml.) was treated rapidly with mercaptoacetic acid (0.96 g., 10.4 mmoles) with stirring at 25°. The solution was refluxed gently with stirring for four hours, at which time, considerable solid had separated. The reaction mixture was stirred to 25° and then cooled to 0–5°. After one hour, the product was collected and washed with water (150 ml.), followed by isopropanol (150 ml.) to produce 1.35 g. (76.6%) of colorless irregular prisms, M.P. 268–270° dec. (lit.[2] M.P. 268–269° dec.). Infrared (IR) in KBr: cm.$^{-1}$ 3450, 3100, 3080, 3040, 2920, 1700, 1620, 1480, 1415, 1395, 1350, 1220, 1200, 1120, 1100, 1070, 1050, 980, 930, 905, 820, 680. Nuclear Magnetic Resonance (NMR): (D$_2$O–DCl)$\tau$ 1.33, 1.46, 2.00, 2.12. (2d, 4, J 7 Hz., 4-pyridyl) 5.65 (S, 2, CH$_2$ of CH$_2$CO$_2$H); mass spectrum, $m/e$ 169 (M$^+$), 125 (base peak), 111, 78, 51.

EXAMPLE 2

Preparation of (4-pyridylthio)acetic acid: A solution of 4-(1-pyridyl)pyridinium chloride hydrochloride (50.0 g., 0.202 mole) in water (500 ml.) was neutralized to pH 7.0 with 50% NaOH. The solution was then carbon treated with 12.5 g. of charcoal for 45 minutes. The mixture was filtered, the filter cake washed well with water, and the filtrate volume adjusted to 600 ml. with water. The filtrate, which was pale yellow, was divided into two portions. One portion (A) was treated with 13 ml. of 2-mercaptoacetic acid and refluxed for three hours. The other portion was decolorized for 45 minutes with an additional 6.3 g. of charcoal and the filtrate (500 ml.) was treated with 13 ml. of 2-mercaptoacetic acid and refluxed for three hours (B). Both reactions A and B were cooled to 0–5° and held for two hours. "A" gave 17.20 g. (93.0%); M.P. 268—270° dec. Color was good. "B" gave 17.68 g. (95.5%); M.P. 268–270° dec. Color was good. Total yield=34.88 g. (94.2%) of the title product. IR and NMR spectra were consistent with the structure.

EXAMPLE 3

Preparation of (4-pyridylthio)acetyl chloride hydrochloride

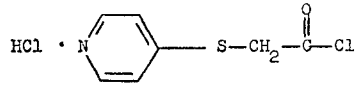

(4-pyridylthio)acetic acid (1000 grams, 5.9 moles) was slurried in 4 liters of methylene chloride in a 50 liter vessel fitted with condenser. The slurry was saturated with dry hydrogen chloride gas for twenty minutes. The heavy slurry was stirred slowly and phosphorous pentachloride (1550 grams, 7.42 moles) was added in increments over a ten to twenty minute period. The slurry thinned and after one hour an oily phase was noted as a lower layer.

[1] D. Jerchel, H. Fischer and K. Thomas, Chem. Ber., 89, 2921 (1956).
[2] H. King and L. L. Ware, J. Chem. Soc., 873 (1939).

The oily slurry was stirred an additional hour at 25° C. The reaction mixture was warmed to slight reflux while the hydrogen chloride gas boiled off over a two hour period. The oily layer crystallized during this time. An additional thirty-four liters of dry methylene chloride was added over a two hour period with slight reflux continuing. The crystal slurry was cooled to 25° C. over a one hour period and then chilled about eight hours at 0° C. The solid crystalline material was collected by filtration and washed with methylene chloride. Precautions to protect against moisture were used. The solid cake was vacuum dried over P$_2$O$_5$. The product, (4-pyridylthio)acetyl chloride hydrochloride, was obtained in about 80% yield and was a minimum of 85% pure.

EXAMPLE 4

Preparation of 7-[α(4-pyridylthio)acetamido] cephalosporanic acid

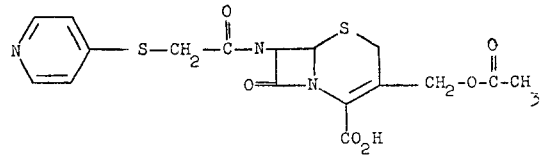

7-aminocephalosporanic acid (1000 g., 3.68 moles) was slurried in twenty-five l. of methylene chloride. The slurry was cooled to 0° C. and dry triethylamine (1780 ml., 12.7 moles) was added to the slurry. Complete solution was obtained in about 10 minutes. The solution was chilled to −10° C. and (4-pyridylthio)-acetyl chloride hydrochloride (950 g., 4.25 moles) was added to the reaction in increments to maintain the temperature at <5° C. The slurry was then stirred at 0° C. for 30 minutes and then at 20–25° C. for an additional hour. Ten liters of water were added to the reaction mixture and stirred for about two minutes. The pH was in the range of 7.3 to 7.5. The mixture was acidified to pH 1.8–2.0 with 6 N HCl, approximately 1325 ml.

The mixture was stirred five minutes and the organic phase separated from the aqueous phase. The organic phase was re-extracted with an additional three liters of water and the aqueous phases combined. The combined aqueous phase was adjusted to pH 3.0 to 3.2 with triethylamine. After stirring for ten minutes, 250 grams of decolorizing charcoal was added and the slurry was stirred for 5 minutes. The slurry was filtered through filtering aid. Twenty-five liters of acetone was added to the aqueous solution. Crystallization commenced shortly thereafter at 20° to 25° C. The slurry was stirred for at least thirty minutes. The pH rose as crystallization occurred. An additional 15 liters of acetone were added over a one hour period as the crystallization continued. The pH eventually rose to 3.7. The slurry was cooled at 0° C. for at least three hours and the solids were collected by filtration. The filter cake was washed with 15 liters of acetone and then dried at 50° C. to remove most of the acetone, and redried in vacuo. The solid, 7-[α-(4-pyridylthio)acetamido]-cephalosporanic acid, collected weighed about 1200 grams (75%). If desired, the solid product may be recrystallized from acetone-water (see U.S. Pat. No. 3,422,100).

We claim:
1. A process for the preparation of the compound having the formula

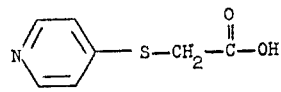

I which consists of mixing together a compound having the formula

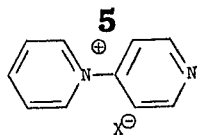

in which X is chloro, bromo or iodo; or a hydrate or acid addition salt thereof; with at least 1 molar equivalent of 2-mercaptoacetic acid in water.

2. A process of claim 1 which consists of mixing together a compound of Formula II with about 1 to about 1.5 molar equivalents of 2-mercaptoacetic acid in water, with or without the aid of heat, to produce Compound I.

3. A process of claim 1 which consists of mixing together a compound of Formula II with about 1 to about 1.5 molar equivalents of 2-mercaptoacetic acid in water, with the aid of heat to produce Compound I.

4. A process of claim 1 which consists of mixing together a compound of Formula II with about one molar equivalent of 2-mercaptoacetic acid, in water with stirring, at a temperature in the range of about 50° C. to about the reflux temperature of the solvent system, for a period of time of about 1 to about 10 hours, to produce Compound I.

5. A process of claim 1 which consists of mixing together a compound of Formula II in which X is chloro, with about one molar equivalent of 2-mercaptoacetic acid, in water with stirring at about reflux temperature of the solvent system, for a period of time of about 4 hours to produce Compound I.

References Cited

Jerchel, Chem. Abstracts, vol. 65, 18,565–d–f, (1966).
Jerchel et al., Chem. Abstracts, vol. 51, 8737c–8738h (1957).

ALAN L. ROTMAN, Primary Examiner

U.S. Cl. X.R.

260—243 C, 296 D; 424—246